United States Patent
Ikeda

(10) Patent No.: US 11,715,047 B2
(45) Date of Patent: Aug. 1, 2023

(54) IMAGE PROCESSING APPARATUS, IMAGE PROCESSING METHOD

(71) Applicant: Toyota Jidosha Kabushiki Kaisha, Toyota (JP)

(72) Inventor: Takuya Ikeda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 645 days.

(21) Appl. No.: 16/519,570

(22) Filed: Jul. 23, 2019

(65) Prior Publication Data

US 2020/0034618 A1 Jan. 30, 2020

(30) Foreign Application Priority Data

Jul. 30, 2018 (JP) .............................. JP2018-142509

(51) Int. Cl.
| | |
|---|---|
| *G06V 20/10* | (2022.01) |
| *G06Q 10/0631* | (2023.01) |
| *G06F 3/0481* | (2022.01) |
| *G06V 10/20* | (2022.01) |

(52) U.S. Cl.
CPC ....... *G06Q 10/0631* (2013.01); *G06F 3/0481* (2013.01); *G06V 10/255* (2022.01); *G06V 20/10* (2022.01)

(58) Field of Classification Search
CPC ... G06V 20/10; G06F 3/0481; G06Q 10/0631
USPC ....................................................... 382/103
See application file for complete search history.

(56) References Cited

U.S. PATENT DOCUMENTS

| | | | |
|---|---|---|---|
| 7,554,282 B2 | 6/2009 | Nakamoto | |
| 11,055,759 B1 * | 7/2021 | Natesh | ................. G06Q 30/018 |
| 2012/0075464 A1 | 3/2012 | Derenne et al. | |
| 2013/0343640 A1 * | 12/2013 | Buehler | .................. G06F 17/00 382/155 |
| 2015/0074746 A1 * | 3/2015 | Kohno | .................... G06F 21/34 726/1 |
| 2015/0081338 A1 | 3/2015 | Lai et al. | |

(Continued)

FOREIGN PATENT DOCUMENTS

| | | |
|---|---|---|
| CN | 108293105 A | 7/2018 |
| DE | 112011104645 T5 | 10/2013 |

(Continued)

*Primary Examiner* — Hope C Sheffield
(74) *Attorney, Agent, or Firm* — Dinsmore & Shohl LLP

(57) ABSTRACT

The image processing apparatus for performing display restriction processing on a captured image captured by a moving robot includes: a task acquisition unit configured to acquire information that corresponds to a property of a task to be executed via the remote operation performed on the moving robot; a target object identification unit configured to identify target objects in the captured image; a restricted target object specification unit configured to specify a target object for which a display restriction is required among the target objects identified in the target object identification unit in accordance with the property of the task to be executed by the moving robot based on the above information; and a display restriction processing unit configured to perform the display restriction processing on a restricted area in the captured image that corresponds to the target object for which display restriction is required.

8 Claims, 11 Drawing Sheets

(56) References Cited

U.S. PATENT DOCUMENTS

| | | | | |
|---|---|---|---|---|
| 2017/0220816 A1* | 8/2017 | Matusek | ............. | G06F 21/6245 |
| 2017/0300757 A1* | 10/2017 | Wolf | ......................... | G06T 7/90 |
| 2018/0330591 A1* | 11/2018 | Tilkin | ................... | G11B 27/34 |
| 2018/0359449 A1 | 12/2018 | Matsumoto et al. | | |
| 2019/0197254 A1* | 6/2019 | Salgar | .............. | G08B 13/19621 |
| 2020/0311616 A1* | 10/2020 | Rajkumar | ............. | G06N 3/008 |

FOREIGN PATENT DOCUMENTS

| | | |
|---|---|---|
| JP | 2003-291084 A | 10/2003 |
| JP | 2005-056213 A | 3/2005 |
| JP | 2016-203276 A | 12/2016 |
| WO | 2012091807 A2 | 7/2012 |

* cited by examiner

IMAGE PROCESSING APPARATUS, IMAGE PROCESSING METHOD

CROSS REFERENCE TO RELATED APPLICATIONS

This application is based upon and claims the benefit of priority from Japanese patent application No. 2018-142509, filed on Jul. 30, 2018, the disclosure of which is incorporated herein in its entirety by reference.

BACKGROUND

The present disclosure relates to an image processing apparatus and an image processing method suitable for processing of a captured image of a surrounding environment captured by a moving robot that performs a remote operation.

A moving robot that is configured to be able to enable a remote operator to perform an operation via a remote operation terminal has been known. The remote operator remotely operates a moving robot while looking at a captured image of a surrounding environment captured by an image-capturing unit of this moving robot using a remote operation terminal and provides services such as nursing care for a service user. Japanese Unexamined Patent Application Publication No. 2016-203276 discloses, in a remote operation system including the aforementioned moving robot, a technique for displaying, when the captured image includes a part that the service user does not want to display, a processed image obtained by performing display restriction processing such as paint-out processing on this part, on a remote operation terminal.

SUMMARY

According to the technique disclosed in Japanese Unexamined Patent Application Publication No. 2016-203276, the image obtained by performing the display restriction processing on the captured image captured by the image-capturing unit is displayed on the remote operation terminal, whereby it is possible to protect the privacy of the service user. In the technique disclosed in Japanese Unexamined Patent Application Publication No. 2016-203276, however, it is possible that the remote operator may not be able to sufficiently recognize target objects that are necessary to accomplish a task from the image on which the display restriction processing has been performed, and it may not be possible to cause the moving robot to accurately perform the task by the remote operation.

The present application has been made in view of the aforementioned background, and aims to provide an image processing apparatus capable of presenting an image that enables the remote operator to remotely operate the moving robot appropriately to enable the task to be accomplished for the remote operator while protecting privacy.

An image processing apparatus according to the present disclosure is an image processing apparatus that performs display restriction processing on a captured image captured by an image-capturing unit in a moving robot, the moving robot including the image-capturing unit being configured to capture an image of a surrounding environment, and the moving robot being further configured to be able to perform a remote operation via a remote operation terminal, the image processing apparatus including; a task acquisition unit configured to acquire information that corresponds to a property of a task to be executed via the remote operation performed on the moving robot; a target object identification unit configured to identify target objects in the captured image; a restricted target object specification unit configured to specify a target object for which a display restriction is required among the target objects identified in the target object identification unit in accordance with the property of the task to be executed by the moving robot based on the information acquired by the task acquisition unit; and a display restriction processing unit configured to perform the display restriction processing on a restricted area in the captured image that corresponds to the target object for which the display restriction is required, in which the display restriction processing unit outputs image data of the image that has been subjected to the display restriction processing to a transmission unit configured to transmit the image data to the remote operation terminal.

By changing the target object in the captured image whose display is to be restricted in accordance with the property of the task to be executed by the moving robot, there is no possibility that a display restriction may be imposed on the target object in the captured image that the remote operator needs to clearly see in order to enable the task to be accomplished. That is, only necessary and sufficient display restriction may be imposed on the captured image in order to enable the task to be accomplished. Accordingly, it is possible to present an image that enables the remote operator to remotely operate the moving robot appropriately to enable the task to be accomplished while protecting privacy.

The display restriction processing unit may define the restricted area along the contour of the target object for which the display restriction is required by segmentation using the segmentation by an algorithm of machine learning as a technique for identifying the target objects in the captured image. By using the segmentation by the algorithm of the machine learning, it is possible to rapidly identify the target object in the captured image.

The display restriction processing unit may determine the accuracy of detecting the contour of the target object for which the display restriction is required in accordance with the property of the task to be executed by the moving robot. According to this procedure, it is possible to reduce the processing load in the image processing apparatus.

The display restriction processing unit may superimpose information regarding the target object for which the display restriction is required on the restricted area that corresponds to the target object by a predetermined method. According to this procedure, it becomes clear what the target object on which the display restriction processing has been performed is, whereby it becomes possible for the remote operator to provide a more appropriate service for the service user.

The restricted target object specification unit may determine the area of the target object in the captured image that does not relate to the task to be executed by the moving robot, and then the display restriction processing unit may perform simplification processing on the area of the target object that does not relate to the task to be executed by the moving robot. According to this procedure, it is possible to reduce the volume of the image data of the image that has been subjected to the display restriction processing.

The task to be executed by the moving robot, the task being acquired by the task acquisition unit, may be input by the remote operation terminal. When the task to be executed by the moving robot is one autonomously performed by the moving robot, the remote operator only performs monitoring by the remote operation terminal and does not operate the moving robot. By causing the task acquired by the task acquisition unit to be input by the remote operation terminal, when the task is autonomously performed by the moving robot, the target object in the captured image whose display is to be restricted can be uniformly set. According to this procedure, it becomes possible to prevent an increase in the unnecessary processing load when the moving robot autonomously performs the task.

A service user who receives a service provided by the moving robot may be able to correct criteria for specifying a target object for which a display restriction is required in accordance with the property of the task to be executed by the moving robot in the restricted target object specification unit. According to this procedure, when, for example, some problem occur in the task execution after the actual operation of the moving robot or when further strengthening of privacy protection does not affect the task execution, the service user can easily correct the above criteria.

An image processing method according to the present disclosure is an image processing method that performs display restriction processing on a captured image captured by an image-capturing unit in a moving robot, the moving robot including the image-capturing unit being configured to capture an image of a surrounding environment, and the moving robot being further configured to be able to perform a remote operation via a remote operation terminal, the method including: a first step for acquiring information that corresponds to a property of a task to be executed via the remote operation performed on the moving robot; a second step for identifying target objects in the captured image; a third step for specifying a target object for which display restriction is required from the target objects identified in the second step in accordance with the property of the task to be executed by the moving robot based on the information acquired in the first step; and a fourth step for performing the display restriction processing on a restricted area in the captured image that corresponds to the target object for which display restriction is required, in which, in the fourth step, image data of the image that has been subjected to the display restriction processing is output to a transmission unit configured to transmit the image data to the remote operation terminal. Accordingly, it is possible to present an image that enables the remote operator to remotely operate the moving robot appropriately to execute a task while protecting privacy.

According to the present application, it is possible to present an image that enables the remote operator to perform an appropriate operation for the remote operator while protecting privacy.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described based on the following embodiment. However, the disclosure set forth in claims is not limited to the following embodiment. Moreover, it is not absolutely necessary to provide all the configurations to be described in the following embodiment as means for solving the problems. The following descriptions and the drawings are omitted and simplified as appropriate for the sake of clarity of description. Throughout the drawings, the same elements are denoted by the same reference symbols, and overlapping descriptions are omitted as appropriate.

First, a remote operation system to which an image processing apparatus according to this embodiment is applied will be explained.

Figure 1:
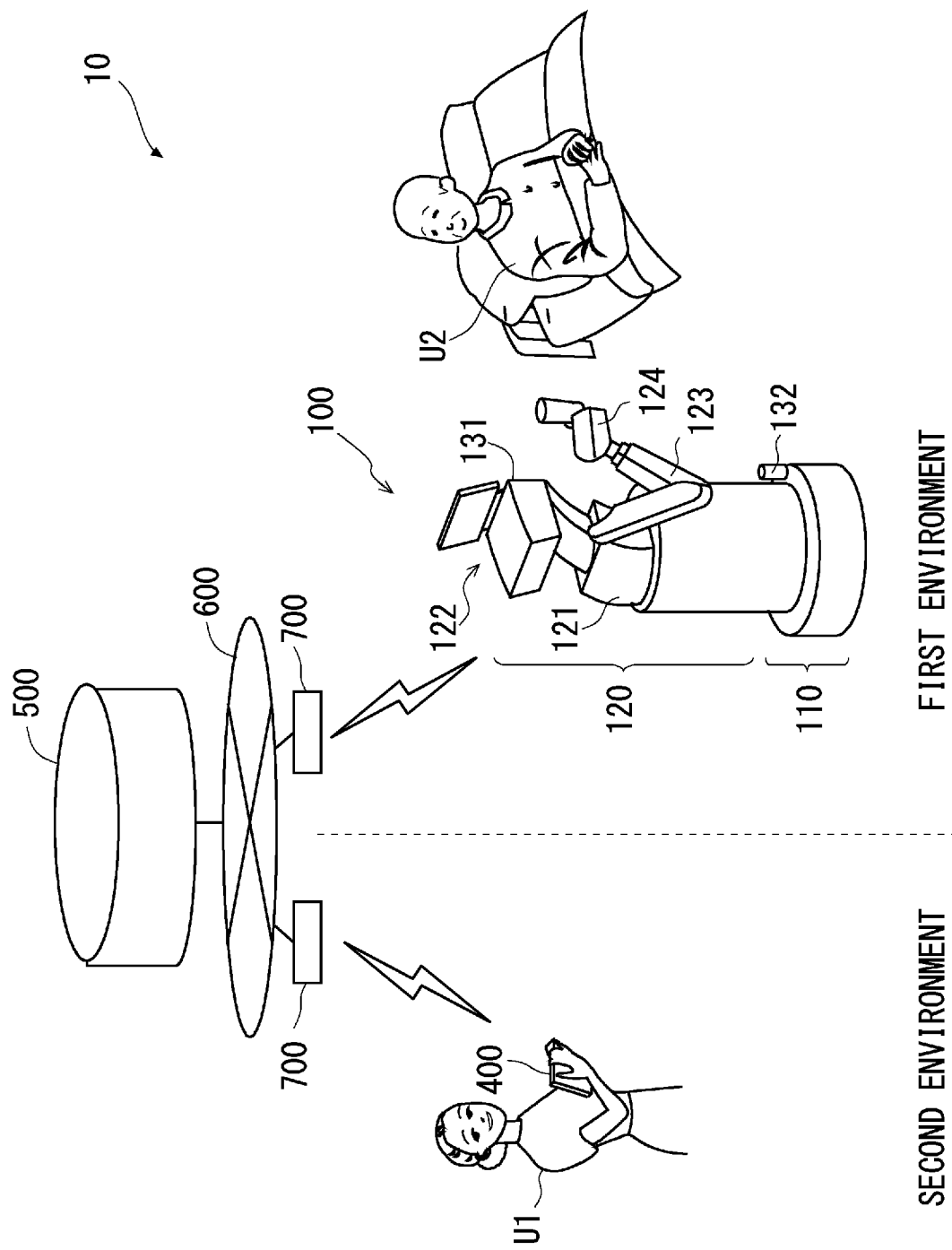
FIG. 1 is a conceptual diagram for describing a usage environment envisaged by a remote operation system into which an image processing apparatus according to an embodiment is incorporated, and the overall structure thereof.

FIG. 1 is a conceptual diagram for describing a usage environment envisaged by the remote operation system into which the image processing apparatus according to this embodiment is incorporated, and the overall structure thereof. As shown in FIG. 1, a remote operation system 10 includes a moving robot 100, a remote operation terminal 400, and a system server 500.

The remote operation system 10 is a system in which a remote operator U1 who is in a second environment remotely operates the moving robot 100 which is in a first environment located away from the second environment using the remote operation terminal 400, and a predetermined service such as a nursing-care service is provided for a service user U2. The remote operator U1 is, for example, a caretaker who takes care of the service user U2, who is a person who requires care. An operation signal from the remote operation terminal 400 is transmitted to the moving robot 100 via the system server 500 connected to the Internet 600. While the Internet is used as a connecting network in this embodiment, another network such as Intranet may instead be used.

The Moving robot 100 is mainly formed of a cart part 110 and a main body part 120. The cart part 110 supports driving wheels and a caster (not shown) in a cylindrical housing. The driving wheels are rotationally driven by a motor, whereby the moving robot 100 is able to translate and turn in a desired direction. The cart part 110 includes a laser scanner 132 in a peripheral part of an upper surface thereof. The laser scanner 132 scans a predetermined range within a horizontal plane for each step angle and outputs whether there is an obstacle in each direction.

The main body part 120 mainly includes a trunk part 121 mounted on an upper surface of the cart part 110, a head part 122 placed on an upper surface of the trunk part 121, an arm 123 supported on a side surface of the trunk part 121, and a hand 124 installed in the tip part of the arm 123. The arm 123 and the hand 124 are driven via a motor (not shown), and grip various kinds of objects in a controlled posture.

The head part 122 mainly includes an image-capturing unit 131. The image-capturing unit 131 includes, for example, a Complementary metal-oxide-semiconductor (CMOS) image, sensor or a Charge-Coupled Device (CCD) image sensor. The image-capturing unit 131 captures an image of a surrounding environment, outputs the captured image as an image signal, and sends this image signal to the image processing apparatus according to this embodiment. The head part 122 can be rotated about a vertical axis (pan axis) or a horizontal axis (tilt axis) with respect to the trunk part 121 by a driving force of a motor (not shown). Further, the head part 122 may be configured to be rotated about an axis in the frontal direction (roll axis) of the image-capturing unit 131. Therefore, the image-capturing unit 131 is able to capture an image of the target object in a desired direction.

The moving robot 100 is connected to the Internet 600 via a wireless router 700 in the first environment. The moving robot 100 receives the operation signal from the remote operator U1 who is in the second environment and executes a movement operation and a gripping operation. The control structure of the moving robot 100 will be explained later.

The system server 500 receives the operation signal from the remote operation terminal 400 operated by the remote operator U1 and transmits the received signal to the moving robot 100. Further, the system server 500 acquires image data of an image that has been subjected to display restriction processing obtained by performing the display restriction processing on the captured image captured by the image-capturing unit 131 using the image processing apparatus according to this embodiment and transmits the acquired image data to the remote operation terminal 400 of the remote operator U1.

The remote operation terminal 400 is an operational terminal for enabling the remote operator U1 to remotely operate the moving robot 100. Various types of information terminals such as a smartphone, a tablet terminal, a personal computer, or a wearable computer may be used as the remote operation terminal 400. The remote operation terminal 400 is connected to the Internet 600 via the wireless router 700 in the second environment located away from the first environment.

The remote operation terminal 400 displays the image that has been subjected to the display restriction processing obtained by performing the display restriction processing on the captured image captured by the image-capturing unit 131 using the image processing apparatus according to this embodiment and various kinds of information for operating the moving robot 100. The remote operator U1 operates the remote operation terminal 400 to operate the moving robot 100 while observing the image that has been subjected to the display restriction processing by the remote operation terminal 400. The operation signal generated by the remote operation terminal 400 is transmitted to the system server 500 via the Internet 600.

The remote operation system 10 may include a service user terminal for enabling the service user U2 to transmit an operation signal or the like to the moving robot 100.

Figure 2:
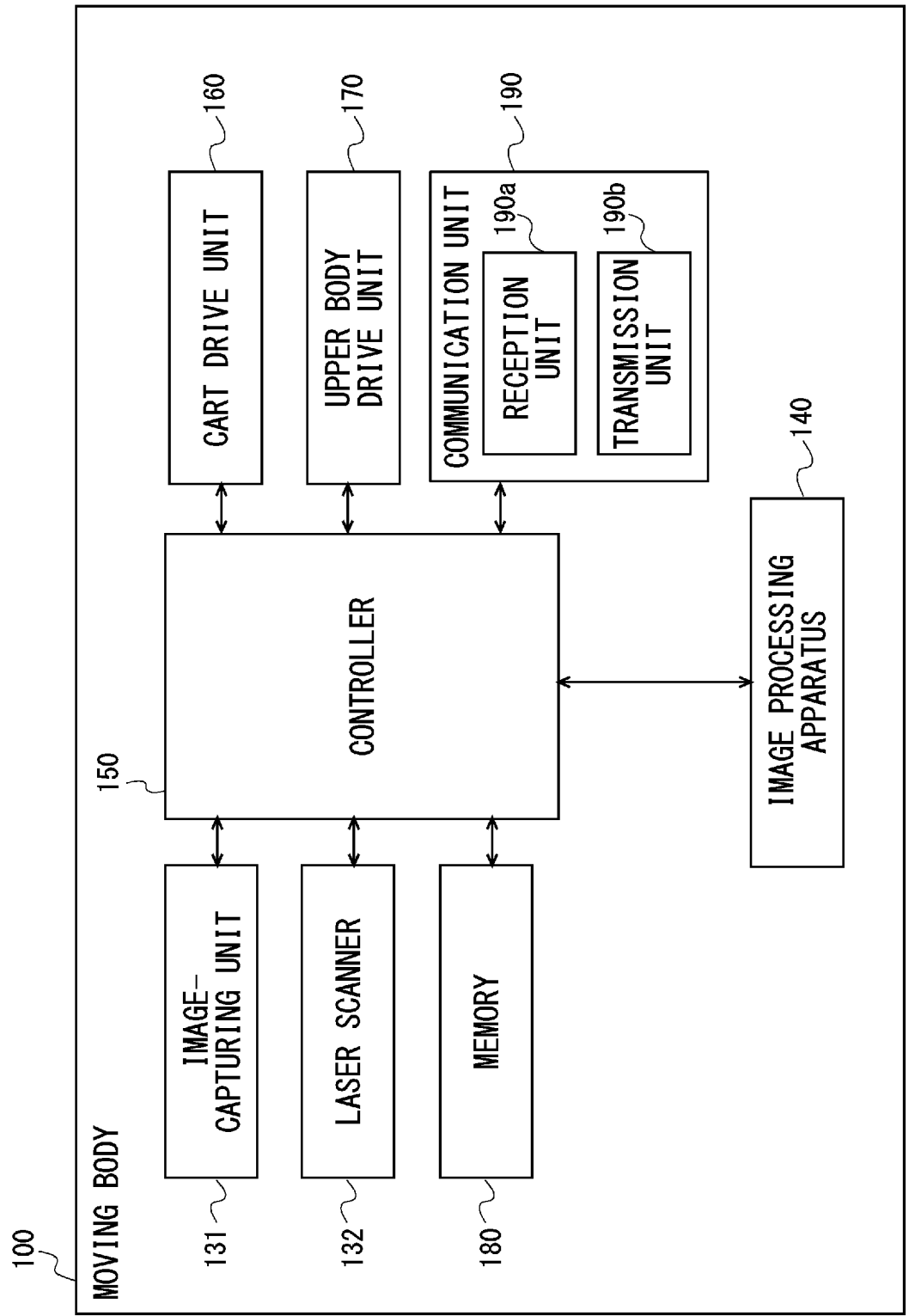
FIG. 2 is a block diagram showing a control structure of a moving robot included in the remote operation system.

Referring next to FIG. 2, a control structure of the moving robot 100 will be explained. In the following description, reference is made also to FIG. 1 as appropriate.

FIG. 2 is a block diagram showing the control structure of the moving robot 100. As shown in FIG. 2, the moving robot 100 includes besides the image-capturing unit 131 and the laser scanner 132 described above, a controller 150, a cart drive unit 160, an upper body drive unit 170, and a communication unit 190. Further, an image processing apparatus 140 according to this embodiment is incorporated into the moving robot 100. Other elements may be added as the control structure of the moving robot 100.

The controller 150, which is, for example, an operation circuit that includes a Central Processing Unit (CPU), is stored, for example, in a control unit included in the trunk part 121. The cart drive unit 160 includes a drive circuit or a motor for driving the driving wheels. The controller 150 sends a drive signal to the cart drive unit 160 in accordance with the operation signal from the remote operator U1, thereby executing the rotation control of the driving wheels. The upper body drive unit 170 includes a grip part including the arm 123 and the hand 124, and a drive circuit or a motor for driving the trunk part 121 and the head part 122. The controller 150 sends the drive signal to the upper body drive unit 170 in accordance with the operation signal from the remote operator U1, thereby executing the grip control and the rotation control of the trunk part 121 and the head part 122. Further, the controller 150 receives a feedback signal such an encoder from the upper body drive unit 170 to grasp the current positions of the arm 123 and the hand 124, and the directions of the trunk part 121 and the head part 122.

A memory 180, which is a non-volatile storage medium, may be, for example, a solid state drive. The memory 180 stores, besides a control program for controlling the moving robot 100, various parameter values, functions, lookup tables and the like used for the control.

The communication unit 190, which is, for example, a wireless LAN unit, performs radio communication with the wireless router 700. The communication unit 190 includes a reception unit 190*a* and a transmission unit 190*b*. The operation signal generated by the remote operation terminal 400 is received by the reception unit 190*a* of the communication unit 190 and is passed to the controller 150. The transmission unit 190*b* is to transmit the image data of the image that has been subjected to the display restriction processing obtained by performing the display restriction processing on the captured image captured by the image-capturing unit 131 using the image processing apparatus according to this embodiment and the various kinds of information for operating the moving robot 100 to the remote operation terminal 400.

The image-capturing unit 131 captures an image of the surrounding environment in accordance with a request from the controller 150, and passes the image data of the captured image to the controller 150. During the execution of the remote operation, the image-capturing unit 131 constantly captures an image of the surrounding environment. The laser scanner 132 detects whether there is an obstacle in accordance with the request from the controller 150, and passes the detection signal, which is the result of the detection, to the controller 150.

The image processing apparatus 140 is an apparatus for performing the display restriction processing on the captured image captured by the image-capturing unit 131 in the moving robot 100. The display restriction processing is image processing performed on a predetermined restricted area in the captured image to make this predetermined restricted area visually unrecognizable or make it difficult to be visually recognized, and is, for example, processing for performing visual abstraction such as paint-out processing, blurring processing, or mosaic processing. The predetermined restricted area is an area in the captured image that corresponds to the target object for which display restriction is required. The area that corresponds to the target object for which display restriction is required may include, besides this target object, an area in the vicinity of the target object. By using the image that has been subjected to the display restriction processing, which is obtained by performing the display restriction processing on the captured image, as the image to be displayed on the remote operation terminal 400, privacy of the service user U2 is protected.

While the structure in which the image processing apparatus 140 is incorporated into the moving robot 100 is shown in FIG. 2, it is merely one example, and a structure in which the image processing apparatus 140 is not incorporated into the moving robot 100 may instead be employed. The image processing apparatus 140 may be incorporated into, for example, the system server 500 shown in FIG. 1. Further, when the image processing apparatus 140 is incorporated into the moving robot 100, the image processing apparatus 140 may be integrally formed with the controller 150.

Figure 3:
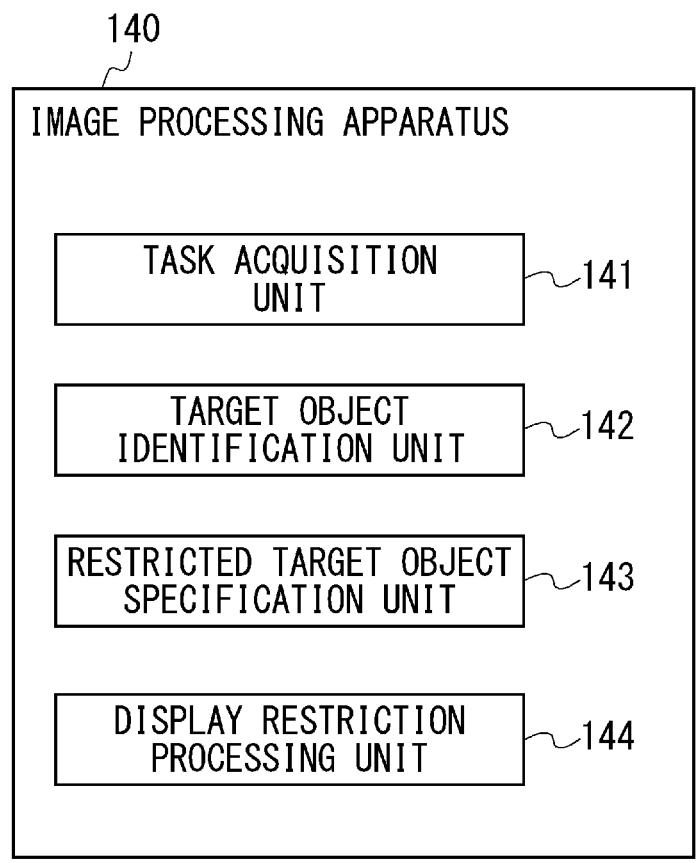
FIG. 3 is a block diagram showing a control structure of the image processing apparatus according to this embodiment.

Referring next to FIG. 3, a control structure of the image processing apparatus 140 will be explained. In the following description, reference is made also to FIGS. 1 and 2.

FIG. 3 is a block diagram showing a control structure of the image processing apparatus 140. As shown in FIG. 3, the image processing apparatus 140 includes a task acquisition unit 141, a target object identification unit 142, a restricted target object specification unit 143, and a display restriction processing unit 144.

The task acquisition unit 141 acquires the task to be executed by the moving robot 100 shown in FIGS. 1 and 2. More specifically, the task acquisition unit 141 acquires information that corresponds to the property of the task to be executed via the remote operation (by the remote operation) performed on the moving robot 100. The task to be executed by the moving robot 100 is a set of actions to handle a certain thing, and includes, for example, a task of changing a diaper of the service user U2 or a task of cleaning the room of the service user U2. The task to be executed by the moving robot 100, which is the task to be executed via the remote operation, is executed, for example, by the remote operator U1 remotely operating the moving robot 100. Otherwise, the task to be executed by the moving robot 100 may be a task autonomously executed by the moving robot 100 by a task start instruction via the remote operation terminal 400 by the remote operator U1. Otherwise, the task to be executed by the moving robot 100 may be a task autonomously executed by the moving robot by an autonomous task start determination by the moving robot 100 in a situation in which the moving robot 100 is monitored by the remote operator U1 (that is, in a situation in which the movement of the moving robot 100 and the surrounding environment thereof can be grasped via the remote operation terminal 400 or the like).

The target object identification unit 142 identifies the target objects in the captured image. The restricted target object specification unit 143 specifies the target object for which display restriction is required from among the target objects identified by the target object identification unit 142 in accordance with the property of the task to be executed by the moving robot. The service user U2 (see FIG. 1) who receives a service provided by the moving robot 100 may be able to correct criteria for specifying the target object for which display restriction is required in accordance with the property of the task to be executed by the moving robot 100 in the restricted target object specification unit 143. In this case, the service user U2 corrects criteria for specifying the target object for which display restriction is required via, for example, an input apparatus such as a service user terminal. The property of the task to be executed by the moving robot means, for example, the type or the purpose of the task.

The display restriction processing unit 144 performs the display restriction processing on the restricted area in the captured image that corresponds to the target object for which display restriction is required. The display restriction processing unit 144 is able to use a general-purpose technique for identifying the target object in the image as a technique for identifying the target object in the captured image. The display restriction processing unit 144 may define the restricted area along the contour of the target object for which display restriction by segmentation is required using, for example, segmentation by an algorithm of machine learning. The segmentation is a technique for identifying the target object in the captured image based on dictionary data obtained by machine learning. The target object identified by the segmentation may be, in a room, for example, a floor, a carpet, a tatami mat, a wall, a chair, a desk, a window, a door, a person, a cat, a dog or the like. By using the segmentation by the algorithm of the machine learning, it is possible to promptly identify the target object in the captured image.

The display restriction processing unit 144 outputs the image data of the image that has been subjected to the display restriction processing to the transmission unit 190b (see FIG. 2) of the communication unit 190. The output image data of the image that has been subjected to the display restriction processing is transmitted to the system server 500 (see FIG. 1) via the transmission unit 190b. As described above, since the image-capturing unit 131 continuously captures an image of the surrounding environment, the image data of the image that has been subjected to the display restriction processing is sequentially output in accordance with the operation by the image-capturing unit 131 and the output data is transmitted to the system server 500.

The task to be executed by the moving robot 100, the task being acquired by the task acquisition unit 141, may be limited to the one input by the remote operation terminal 400 (see FIG. 1) and sent to the task acquisition unit 141. When the task to be executed by the moving robot 100 is one autonomously performed by the moving robot 100, the remote operator U1 only performs monitoring by the remote operation terminal 400 and does not operate the moving robot 100. Therefore, when the task is autonomously performed by the moving robot 100, the target object in the captured image whose display is to be restricted is uniformly set. According to this procedure, it is possible to prevent the unnecessary processing load to be increased when the moving robot 100 autonomously performs the task.

Next, performing the display restriction processing on the restricted area in the captured image that corresponds to the target object specified in accordance with the property of the task will be specifically explained. In the following description, reference is also made to FIGS. 1 and 2 as necessary.

Figure 4:
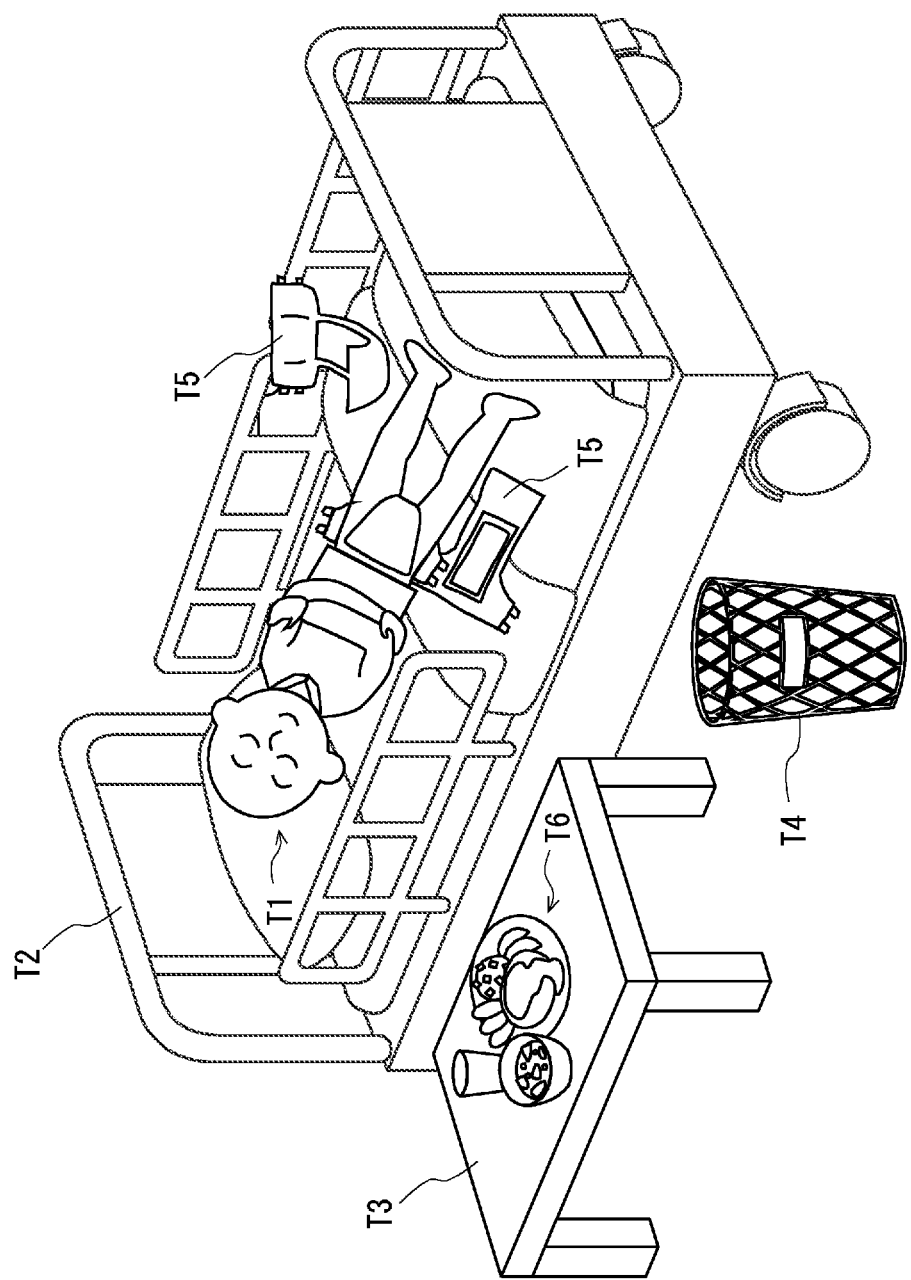
FIG. 4 is a schematic view showing one example of a captured image of a room of a service user, the captured image being captured by an image-capturing unit of the moving robot.

FIG. 4 is a schematic view showing one example of the captured image of the room of the service user U2 captured by the image-capturing unit 131 (see FIG. 1) of the moving robot 100. As shown in FIG. 4, the room of the service user U2 includes, as the target objects, besides the person T1 including the service user U2, a bed T2, a desk T3, a garbage can T4, diapers T5, a dish T6 and the like. The diapers T5 include the one currently worn by the person T1 and the one for replacement placed on the bed T2. The dish T6 is placed on the desk T3.

Figure 5:
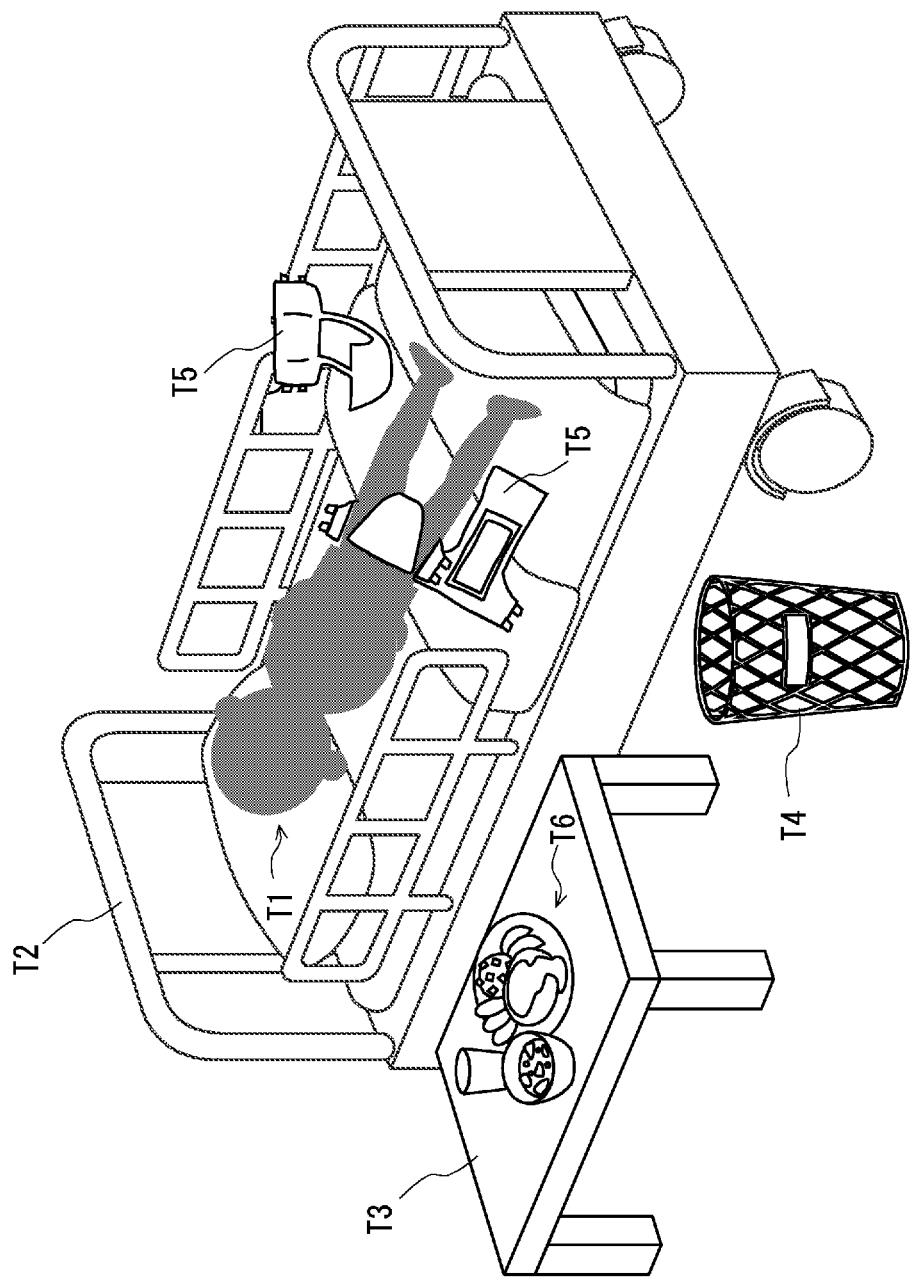
FIG. 5 is a schematic view showing an example of an image that has been subjected to display restriction processing in which the display restriction processing is performed on a restricted area that corresponds to a target object specified in accordance with the property of a task to be executed by the moving robot in the captured image shown in FIG. 4.
Figure 6:
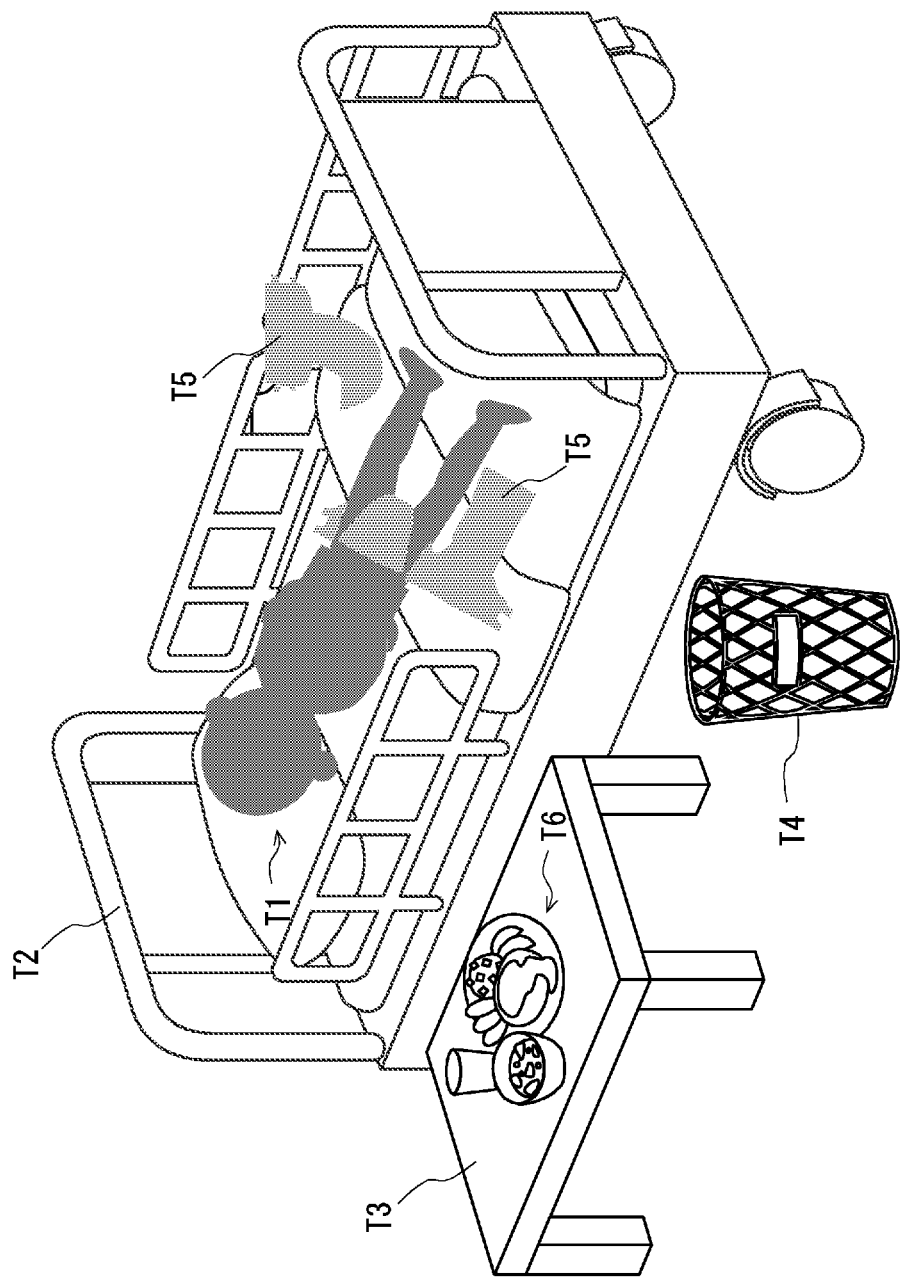
FIG. 6 is a schematic view showing an example of the image that has been subjected to the display restriction processing in which the display restriction processing is performed on the restricted area that corresponds to the target object specified in accordance with the property of the task to be executed by the moving robot in the captured image shown in FIG. 4.

FIGS. 5 and 6 are schematic views each showing an example of the image that has been subjected to the display restriction processing, in which the display restriction processing is performed on the restricted area that corresponds to the target object specified in accordance with the property of the task to be executed by the moving robot 100 in the captured image shown in FIG. 4. It is assumed that the display restriction processing is paint-out processing. It is further assumed that the task in the example shown in FIG. 5 is to change the diaper T5 and the task in the example shown in FIG. 6 is to clean the room.

As shown in FIG. 5, when the task is to change the diaper T5, the person T1 is specified as the target object and the diapers T5 are not specified. That is, in the captured image captured by the image-capturing unit 131 (see FIG. 1), the restricted area that corresponds to the person T1 is subjected to paint-out processing, whereas the diapers T5 can be visually recognized. When the diaper T5 is changed, if the remote, operator U1 (see FIG. 1) cannot clearly see the diapers T5, it is possible that the task may not be appropriately accomplished (e.g., dirt adhered to the diaper T5 may drop off). Therefore, the appropriate accomplishment of the task is prioritized over privacy of the service user U2 (see FIG. 1).

As shown in FIG. 6, when the task is to clean the room, the person T1 and the diapers T5 are specified as the target objects. That is, in the captured image captured by the image-capturing unit 131 (see FIG. 1), the restricted areas that correspond to the person T1 and the diapers T5 are subjected to paint-out processing. When the room is cleaned, it is sufficient that the remote operator U1 (see FIG. 1) be able to recognize the person T1 and the diapers T5 as the obstacles, and the remote operator U1 does not need to clearly see the target objects. Therefore, privacy of the service user U2 (see FIG. 1) is prioritized.

As described above, by changing the target object in the captured image whose display is to be restricted in accordance with the property of the task, there is no possibility that a display restriction may be imposed on the target object in the captured image that the remote operator U1 needs to clearly see in order to enable the task to be accomplished. That is, only necessary and sufficient display restriction can be imposed on the captured image to enable the task to be accomplished. Accordingly, it is possible to present an image that enables the remote operator to perform an appropriate operation for the remote operator while protecting privacy.

In the ease described with reference to FIG. 5 in which the task is to change the diaper T5, a part of the person T1 may be specified as the target object, and paint-out processing, which is the display restriction processing, may be performed on the restricted area that corresponds to this part of the person T1. In the semantic segmentation, instead of detecting the whole captured image or a part of the image, each pixel is labeled with the meaning indicated by it, whereby it is possible to identify the target object in the captured image more finely. When, for example, semantic segmentation, which is one method of segmentation, is used, each of the parts-like the "face", "outerwear", "pants", and "underwear"—of the person T1, who is the target object, can be identified.

Figure 7:
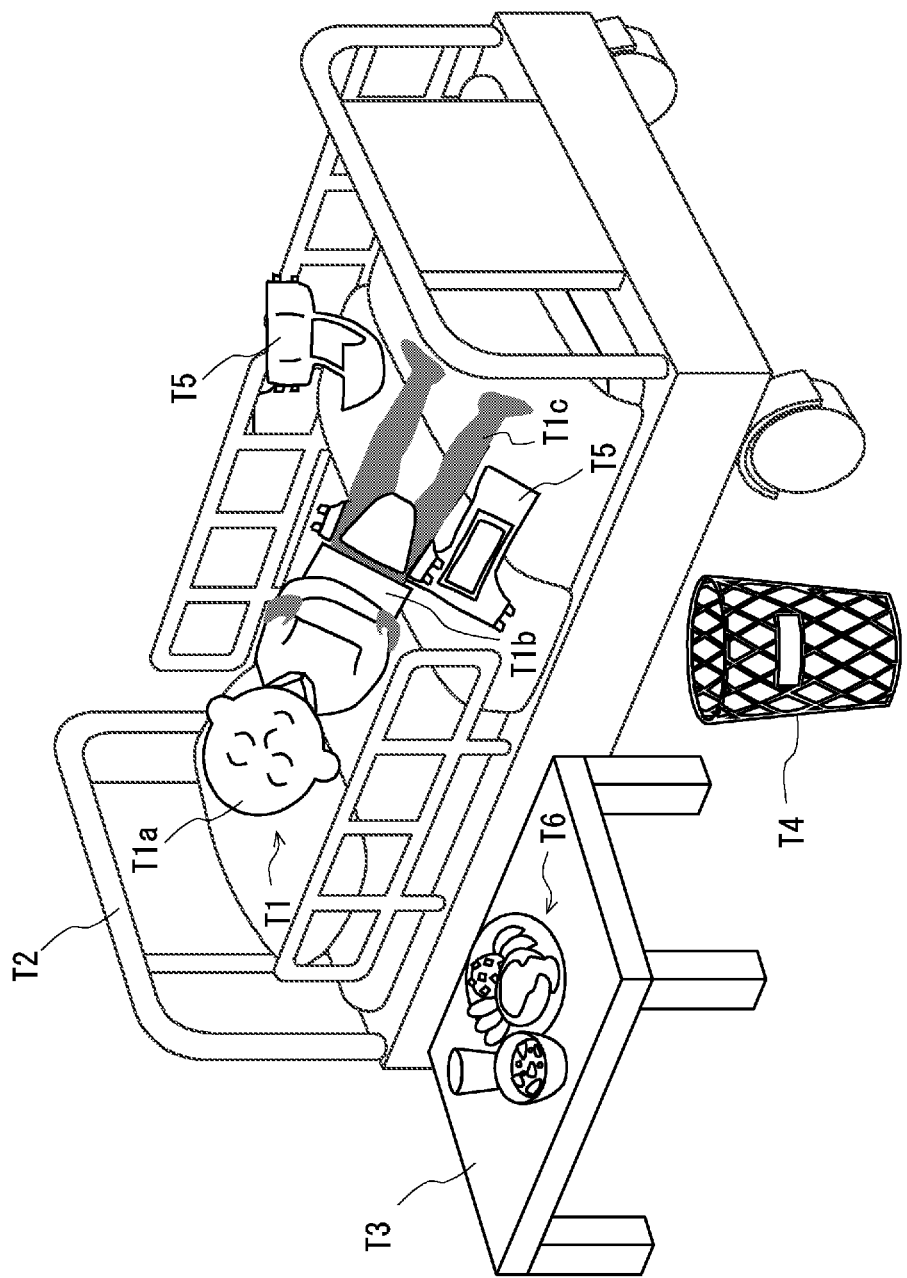
FIG. 7 is a schematic view showing a state in which the display restriction processing is performed on the captured image shown in FIG. 4 using semantic segmentation.

FIG. 7 is a schematic view showing a state in which the display restriction processing is performed on the captured image shown in FIG. 4 using the semantic segmentation. When the task is to change a diaper, in the example shown in FIG. 5, the whole person T1, who is the target object that has been specified, is painted out. On the other hand, when the semantic segmentation is used, as shown in FIG. 7, paint-out processing, which is the display restriction processing, may be performed only on the restricted area in the captured image that corresponds to an exposed skin T1c except a face T1a. That is, in the captured image, the face T1a and clothes T1b of the person T1, who is the target object, can be visually recognized. According to this procedure, the remote operator U1 (see FIG. 1) is able to perform work while checking the facial expression of the service user U2 (see FIG. 1) when he/she changes the diaper T5, whereby it becomes possible for the remote operator U1 to provide a more appropriate service for the service user U2.

In the image that has been subjected to the display restriction processing shown in FIGS. 5 and 6, the accuracy of detecting the contour of the target object for which display restriction is required in the display restriction processing unit 144 (see FIG. 3) in the case in which the task is to change the diaper T5 and that in the case in which the task is to clean the room are made the same. On the other hand, in the display restriction processing unit 144, the accuracy of detecting the contour of the target object for which display restriction is required may be determined in accordance with the property of the task to be executed by the moving robot 100.

Figure 8:
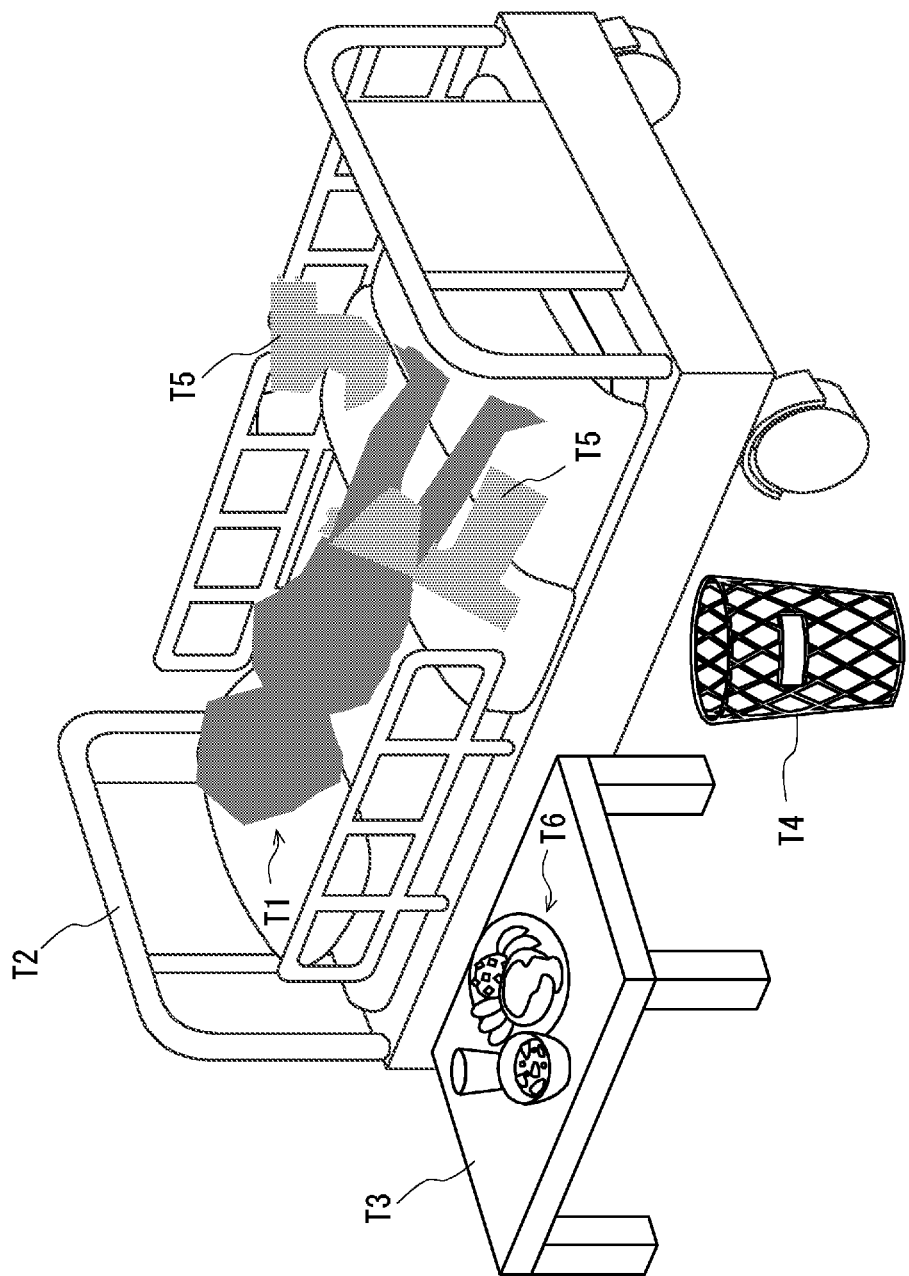
FIG. 8 is a schematic view showing one example of an image that has been subjected to the display restriction processing when the accuracy of detecting the contour of the target object for which display restriction is required is determined in accordance with the property of the task to be executed by the moving robot.

FIG. 8 is a schematic view showing one example of the image that has been subjected to the display restriction processing when the accuracy of detecting the contour of the target object for which display restriction is required is determined in accordance with the property of the task to be executed by the moving robot 100. When the task is to change the diaper T5, as shown in FIG. 5, the display restriction processing is performed on the captured image along the contour of the target object for which display restriction is required more strictly in order to enable the task to be accomplished without fail.

On the other hand, when the task is to clean the room, as shown in FIG. 8, the accuracy of detecting the contour of the target object for which display restriction is required in the captured image is roughened more than that in the case in which the task is to change the diaper T5. When the accuracy of detecting the contour of the target object for which display restriction is required is roughened, the area including the area in the vicinity of the target object, which is an area outside the area of the target object, in the restricted area that corresponds to the target object increases, whereby the outer shape of the target object becomes more blurred. When the task is to clean the room, however, the task can be accomplishes even when the outer shape of the target object in the captured image for which display restriction is required becomes blurred. In this way, when the task can be accomplished even when the outer shape of the target object becomes blurred by the display restriction processing, it becomes possible to reduce the processing load in the image processing apparatus 140 by roughening the accuracy of detecting the contour of the target object (see FIG. 3).

Figure 9:
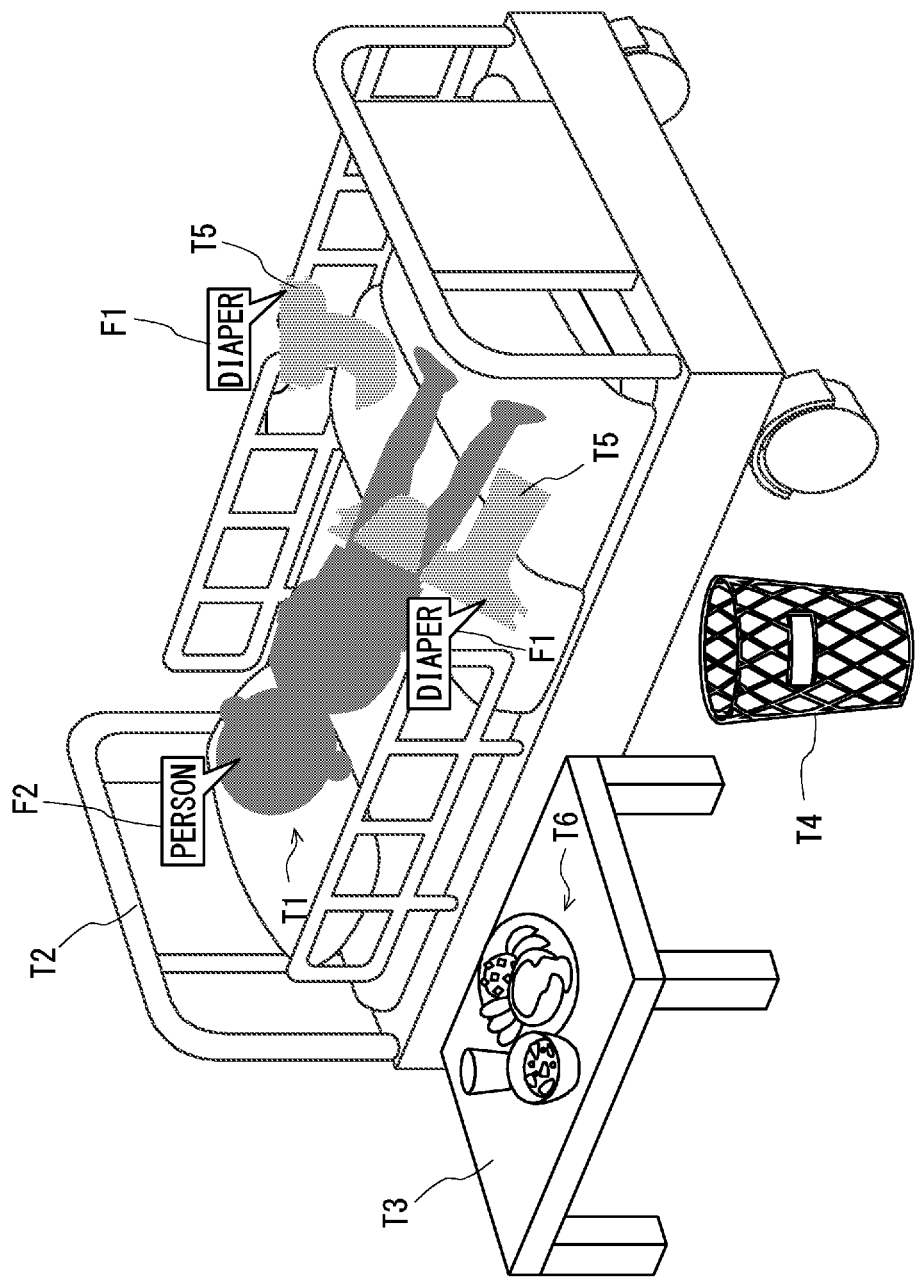
FIG. 9 is a schematic view showing a state in which information regarding the target object for which display restriction is required is superimposed on the restricted area that corresponds to the target object by a predetermined method in the image that has been subjected to the display restriction processing.

The display restriction processing unit 144 shown in FIG. 3 may superimpose information regarding the target object for which display restriction is required on the restricted area that corresponds to the target object by a predetermined method. FIG. 9 is a schematic view showing a state in which the information regarding the target object for which display restriction is required is superimposed on the restricted area that corresponds to the target object by a predetermined method in the image that has been subjected to the display restriction processing. As shown in FIG. 9, information regarding the target objects is displayed on the person T1 and the diapers T5, which are the target objects on which the display restriction processing has been performed, using balloons F1 and F2 in the vicinity of the target objects. According to this procedure, it becomes clear what the target objects on which the display restriction processing has been performed are, whereby it becomes possible for the remote operator U1 (see FIG. 1) to provide a more appropriate service for the service user U2 (see FIG. 1).

In the image processing apparatus 140 shown in FIG. 3, the restricted target object specification unit 143 may determine the area of the target object in the captured image that does not relate to a task, and the display restriction processing unit 144 may perform simplification processing on the restricted area that corresponds to the target object that does not relate to a task. The simplification processing means performing the display restriction processing on all the restricted areas that correspond to the target objects. For example, common display restriction processing is performed on all the restricted areas that correspond to these target objects.

Figure 10:
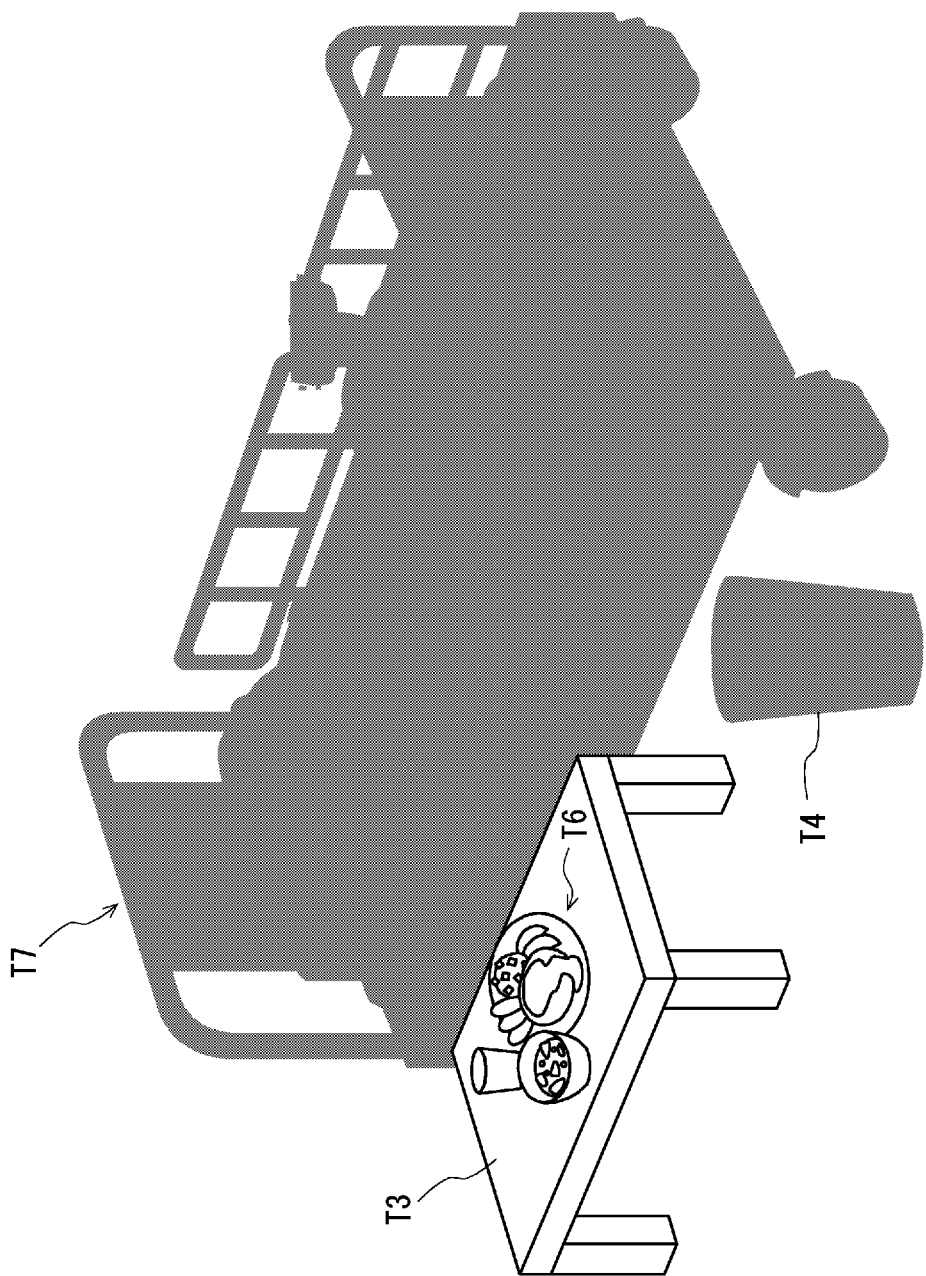
FIG. 10 is a schematic view showing an example in which simplification processing is performed on an area of the target object that does not relate to a task the image that has been subjected to the display restriction processing.

FIG. 10 is a schematic view showing an example in which simplification processing is performed on the restricted area that corresponds to the target object that does not relate to a task in the image that has been subjected to the display restriction processing. When the task is to clear away the dish T6, in the captured image shown in FIG. 4, the person T1, the bed T2, the garbage can T4, and the diaper T5 included in this captured image are target objects that do not relate to this task. Therefore, as shown in FIG. 10, in the image that has been subjected to the display restriction processing, common display restriction processing is performed on an integrated area T7 that includes the person T1, the bed T2, and the diaper T5, and the garbage can T4, which are the target objects that do not relate to this task.

According to this procedure, it is possible to reduce the volume of the image data of the image that has been subjected to the display restriction processing. Accordingly, in the case in which the image data of the image that has been subjected to the display restriction processing is sequentially transmitted from the image processing apparatus 140 shown in FIG. 3 to the remote operation terminal 400 shown in FIG. 1 as well, it is possible to reduce disturbance that occurs in the image that has been subjected to the display restriction processing and is to be displayed on the remote operation terminal 400.

Next, a flow of the processing of the image processing apparatus 140 according to this embodiment will be explained. In the following description, reference is made also to FIGS. 1 and 2.

Figure 11:
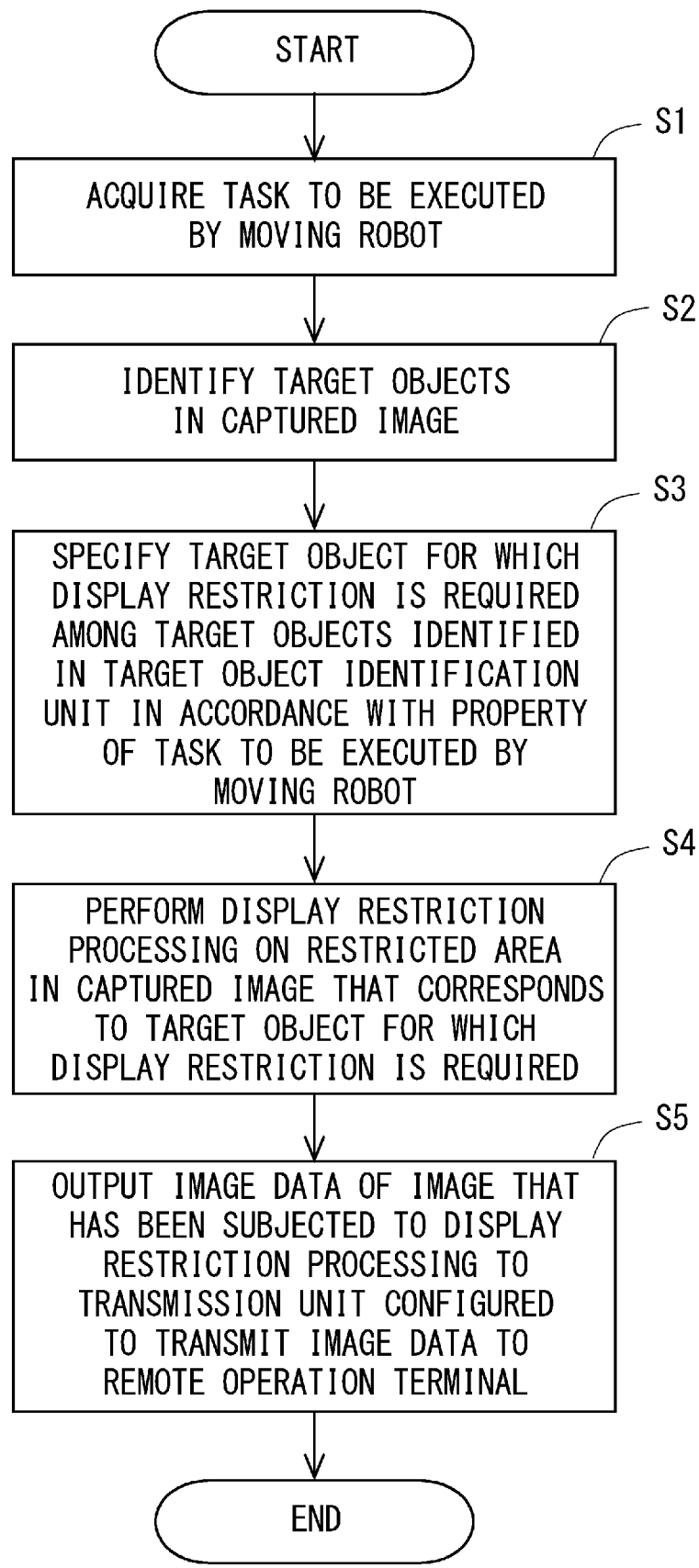
FIG. 11 is a flowchart for describing a flow of the processing in the image processing apparatus according to this embodiment.

FIG. 11 is a flowchart describing a flow of the processing of the image processing apparatus 140 according to this embodiment. As shown in FIG. 11, first, the task acquisition unit 141 acquires the task to be executed by the moving robot (Step S1). Next, the target object identification unit 142 identifies the target objects in the captured image (Step S2). Next, the restricted target object specification unit 143 specifies a target object for which display restriction is required among the target objects identified in the target object identification unit in accordance with the property of the task to be executed by the moving robot (Step S3).

After Step S3, the display restriction processing unit 144 performs the display restriction processing on the restricted area in the captured image that corresponds to the target object for which display restriction is required (Step S4). Next, the display restriction processing unit 144 outputs the image data of the image that has been subjected to the display restriction processing to the transmission unit configured to transmit the image data to the remote operation terminal (Step S5).

From the above, discussion, according to the image processing apparatus according to this embodiment, it is possible to present the image that enables the remote operator to perform an, appropriate operation for the remote operator while protecting privacy.

The present disclosure is not limited to the aforementioned embodiment and may be changed as appropriate without departing from the spirit of the present disclosure.

Further, while the example in which the remote operation system to which the image processing apparatus according to the aforementioned embodiment is applied is used to provide nursing-care services for the service user who receives a service provided by the moving robot has been described, the present disclosure is not limited to this example. The image processing apparatus according to the aforementioned embodiment may be applied to a remote operation system that provides a predetermined service other than the nursing-care services for the service user. For example, the image processing apparatus according to the aforementioned embodiment may be applied to a remote operation system used to provide security services by a mobile robot in an office.

Further, in the aforementioned embodiment, as shown in FIG. 1, the image data of the image that has been subjected to the display restriction processing output from the display restriction processing unit 144 is transmitted to the system server 500 via the transmission unit 190b and further transmitted from the system server 500 to the remote operation terminal 400. However, the image data of the image that has been subjected to the display restriction processing output from the display restriction processing unit 144 may be directly transmitted from the transmission unit 190b to the remote operation terminal 400 via the system server 500. In this case, the image data of the image that has been subjected to the display restriction processing is wirelessly transmitted from the transmission unit 190b to the remote operation terminal 400 via a router.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An image processing apparatus that performs display restriction processing on a captured image captured by an image-capturing unit in a moving robot, the moving robot including the image-capturing unit being configured to capture an image of a surrounding environment, and the moving robot being further configured to be able to perform a remote operation via a remote operation terminal, the image processing apparatus configured to:

acquire information that corresponds to a property of a task to be executed via the remote operation performed on the moving robot;

identify target objects in the captured image;

specify a target object for which a display restriction is required among the identified target objects in accordance with the property of the task to be executed by the moving robot based on the acquired information, wherein the task to be executed by the moving robot includes a set of actions to manipulate one or more of the identified target objects and the property of the task is a type or a purpose of the task;

determine to prioritize visibility of the target object over privacy of a service user when the visibility of the target object is required to accomplish the task;

perform the display restriction processing on a restricted area in the captured image that corresponds to the target object for which display restriction is required and based on the determined priority of visibility of the target object over the privacy of the service user; and output image data of the image that has been subjected to the display restriction processing to a transmission unit configured to transmit the image data to the remote operation terminal.

2. The image processing apparatus according to claim 1, wherein the image processing apparatus is further configured to define the restricted area along a contour of the target object for which display restriction is required by segmentation using the segmentation by an algorithm of machine learning as a technique for identifying the target objects in the captured image.

3. The image processing apparatus according to claim 2, wherein the image processing apparatus is further configured to determine an accuracy of detecting the contour of the target object for which display restriction is required in accordance with the property of the task to be executed by the moving robot.

4. The image processing apparatus according to claim 2, wherein the image processing apparatus is further configured to superimpose information regarding the target object for which display restriction is required on the restricted area that corresponds to the target object by a predetermined method.

5. The image processing apparatus according to claim 1, wherein the image processing apparatus is further configured to determine an area of the target object in the captured image that does not relate to the task to be executed by the moving robot, and perform simplification processing on the area of the target object that does not relate to the task to be executed by the moving robot.

6. The image processing apparatus according to claim 1, wherein the task to be executed by the moving robot is input by the remote operation terminal.

7. The image processing apparatus according to claim 1, wherein the service user who receives a service provided by the moving robot is able to correct criteria for specifying the target object for which a display restriction is required in accordance with the property of the task to be executed by the moving robot via an input apparatus communicatively coupled to the image processing apparatus.

8. An image processing method that performs display restriction processing on a captured image captured by an image-capturing unit in a moving robot, the moving robot including the image-capturing unit being configured to capture an image of a surrounding environment, and the moving robot being further configured to be able to perform a remote operation via a remote operation terminal, the method comprising:

a first step for acquiring information that corresponds to a property of a task to be executed via the remote operation performed on the moving robot;

a second step for identifying target objects in the captured image;

a third step for specifying a target object for which display restriction is required from the target objects identified in the second step in accordance with the property of the task to be executed by the moving robot based on the information acquired in the first step, wherein the task to be executed by the moving robot includes a set of actions to manipulate one or more of the target objects identified in the section step and the property of the task is a type or a purpose of the task;

a fourth step for determining to prioritize visibility of the target object over privacy of a service user when the visibility of the target object is required to accomplish the task; and a fifth step for performing the display restriction processing on a restricted area in the captured image that corresponds to the target object for which display restriction is required and based on the determined priority of visibility of the target object over the privacy of the service user, wherein, in the fifth step, image data of the image that has been subjected to the display restriction processing is output to a transmission unit configured to transmit the image data to the remote operation terminal.

* * * * *